United States Patent [19]

Sato et al.

[11] Patent Number: 4,638,024

[45] Date of Patent: Jan. 20, 1987

[54] POLYMER COMPOSITION COMPRISING A PROTEIN AND A BLOCK COPOLYMER WHICH CONTAINS A POLYVINYL ALCOHOL POLYMER UNIT AND AN IONIC POLYMER UNIT

[75] Inventors: Toshiaki Sato; Junnosuke Yamauchi, both of Kurashiki; Takuji Okaya, Nagaokakyo, all of Japan

[73] Assignee: Kuraray Co., Ltd., Kurashiki, Japan

[21] Appl. No.: 730,100

[22] Filed: May 3, 1985

[30] Foreign Application Priority Data

May 14, 1984 [JP] Japan .................................. 59-97359
Jun. 7, 1984 [JP] Japan ................................ 59-117858

[51] Int. Cl.⁴ ..................... C08L 29/04; C08L 53/00; C08L 89/00
[52] U.S. Cl. ......................................... 524/22; 524/17; 524/23; 524/24; 524/25; 524/26
[58] Field of Search ....................... 524/17, 23, 24, 25, 524/26, 22; 525/59

[56] References Cited

U.S. PATENT DOCUMENTS 3,635,853 1/1972 West ...................................... 524/24
4,002,589 1/1977 Farley et al. .......................... 525/59

FOREIGN PATENT DOCUMENTS 1214404 11/1963 Fed. Rep. of Germany ........ 525/59
46-19046 5/1971 Japan .
54-133543 11/1979 Japan .

*Primary Examiner*—Allan M. Lieberman
*Attorney, Agent, or Firm*—Oblon, Fisher, Spivak, McClelland, & Maier

[57] ABSTRACT

A polymer composition of excellent compatibility which comprises a block copolymer containing a polyvinyl alcohol polymer unit as one constituent and a polymer unit having an ionic group as another constituent, and protein. It is suitable, especially when the protein is gelatin, for making a photographic emulsion, microcapsules, or a photosensitive material, among others.

5 Claims, No Drawings

POLYMER COMPOSITION COMPRISING A PROTEIN AND A BLOCK COPOLYMER WHICH CONTAINS A POLYVINYL ALCOHOL POLYMER UNIT AND AN IONIC POLYMER UNIT

BACKGROUND OF THE INVENTION

1. Field of the Invention

This invention relates to a novel polymer composition.

More particularly, it relates to a polymer composition comprising a block copolymer containing a polyvinyl alcohol polymer unit as one constituent and a polymer unit having an ionic group as another constituent, and protein.

It is, among others, concerned with a polymer composition comprising a block copolymer containing a polyvinyl alcohol polymer unit as one constituent and a polymer unit having an ionic group as another constituent, and gelatin as protein, and which improves the drawbacks of a gelatin film, such as brittleness and stickiness resulting from the absorption of moisture.

2. Description of the Prior Art

A polyvinyl alcohol (PVA) is a water-soluble polymer which is particularly excellent as protective colloid and particularly excellent in film strength and used widely in a variety of fields of application. It is used not only alone, but also together with another water-soluble or -dispersible polymer, for example, starches, cellulose derivatives such as hydroxyethyl cellulose, proteins such as gelatin and casein, or latexes such as SBR. Therefore, the compatibility of PVA with any such water-soluble or -dispersible polymer is one of the very important factors which enables PVA to exhibit its excellent properties fully when used with such other polymers.

It is, however, usual that there is only a poor degree of compatibility between different kinds of polymers. PVA does not have good compatibility with any such water-soluble or -dispersible polymer, particularly proteins such as gelatin or casein, though a lot of attempts have been made to improve their compatibility. The gelatins are used for a wide variety of industrial applications and applications relating to food and medicines, including the preparation of a photographic emulsion and the manufacture of microcapsules, owing to its excellent reversibility from gel to sol and vice versa, depending on temperature, and its properties as a protective colloid, as is well known. There are a great number of reports on the results of studies concerning the gelatins and the improvement of their quality, particularly those relating to gelatins for photographic application.

The gelatins are, however, electrolytes and a gelatin film has the drawbacks which the films of other electrolytic polymers possess. It is brittle and low in strength. Moreover, it is highly sensitive to moisture and becomes sticky in an environment of high humidity. There has, thus, been a strong desire toward the elimination of these drawbacks.

Various attempts have been made to improve the strength of gelatins by blending water-soluble polymers, but have failed to produce any satisfactory results. The gelatins are generally poorly compatible with those polymers and it is often the case that the mixtures are even inferior in strength to the gelatins per se. PVA is known as a water-soluble polymer which forms a particularly strong film, but it is so poorly compatible with the gelatins that its mixture with the gelatins fails to improve their strength. While the production of a strong film from a mixture of gelatin and a water-soluble polymer essentially calls for their good mutual compatibility, there are still very few water-soluble polymers that are satisfactorily compatible with gelatins.

Japanese Laid-Open Patent Specification No. 133543/1979 discloses a water-soluble polymer composition which comprises PVA containing a phosphoric acid group and a water-soluble protein. This composition appears to have somewhat improved compatibility, but the compatibility of this composition is still unsatisfactory.

Japanese Patent Publication No. 19046/1971 discloses a PVA derivative of the formula;

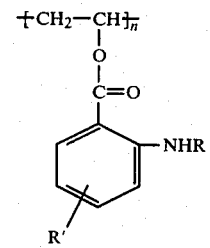

which can be used with gelatin to form a photographic emulsion. This derivative is also unsatisfactory from the standpoint of compatibility.

SUMMARY OF THE INVENTION

As a result of extensive research under these circumstances, the inventors of this invention have discovered that a block copolymer containing a PVA polymer unit as one constituent and a polymer unit having an ionic group as another constituent is well compatible with protein and thereby produces a highly transparent film, and achieved this invention.

We have found that the block copolymer as hereinabove described is particularly well compatible with gelatin and forms therewith a highly transparent film which improves the drawbacks of the conventional gelatin film, that is, brittleness, weakness and stickiness resulting from the absorption of moisture, and achieved this invention. Of course, the sol-gel reversibility of the gelatin depending on temperature, which is the most important characteristic of the gelatins, is not adversely affected by the addition of the block copolymer.

DETAILED DESCRIPTION OF THE PREFERRED EMBODIMENTS

One of the components of the polymer composition according to this invention is a block copolymer containing a PVA polymer unit as one constituent and a polymer unit having an ionic group as another constituent. While this block copolymer can be prepared by a variety of methods, the most preferable method is the radical polymerization of a radical polymerizable monomer having an ionic group in the presence of PVA having a thiol end group which is obtained by the saponification of polyvinyl ester having a thiolcarboxylic acid ester group at its end, as will be described hereinafter and with reference to the examples of this invention.

This method will hereunder be described in detail.

Firstly, PVA having a thiol end group is prepared by the saponification in a customary way of polyvinyl ester which is obtained by the polymerization of vinyl monomers, mainly vinyl ester monomers, in the presence of thiol acid.

The term "thiol acid" as herein used covers thiolcarboxylic acids having a —COSH group, such as thiolacetic acid, thiolpropionic acid, thiolbutyric acid and thiolvaleric acid. Thiolacetic acid is, among others, preferred from the standpoint of decomposition.

It is possible to use any vinyl ester if it is radical polymerizable. Specific examples are vinyl formate, vinyl acetate, vinyl propionate, vinyl ester of versatic acid, vinyl laurate and vinyl stearate. Vinyl acetate is, among others, preferred as it is higher in polymerizability than any other vinyl ester.

The polymerization of a vinyl monomer, mainly vinyl ester such as vinyl acetate, in the presence of thiolcarboxylic acid may be carried out by any process, such as bulk, solution, pearl or emulsion polymerization, in the presence of a radical polymerization initiator. From an industrial standpoint, solution polymerization employing methanol as a solvent is more advantageous than any other method. There is no particular limitation to the amount of the thiolcarboxylic acid which is added, or the method of adding it. They depend on the physical properties desired of PVA to be prepared. The polymerization may be performed batchwise, semicontinuously or continuously, or in any other way known in the art.

The radical polymerization initiator may be selected from known compounds, such as 2,2'-azobisisobutyronitrile, benzoyl peroxide and peroxycarbonate Azo compounds, such as 2,2'-azobisisobutyronitrile, are preferred, as they are easy to handle. It is also possible to use, for example, radiation or electron rays for initiating the polymerization. The polymerization temperature is usually in the range of 30° C. to 90° C. and depends on the kinds of the initiator which is used. If the unpolymerized vinyl ester is removed by a customary method after a predetermined period of polymerization, there is obtained a polyvinyl ester polymer having a thiolcarboxylic acid ester group at its end.

Polyvinyl ester is saponified by a customary method. It is usually beneficial to saponify it in an alcohol, particularly methanol, solution. In order to prepare the solution, it is possible to use not only absolute alcohol, but also alcohol containing a small amount of water, depending on the purpose. It is also possible to add an organic solvent, such as methyl or ethyl acetate, if required. The saponification is usually carried out at a temperature of 10° C. to 70° C. It is preferable to use as a catalyst for saponification an alkaline compound, for example, sodium or potassium hydroxide, or sodium or potassium methylate. While the amount of the catalyst depends on the desired degree of saponification and the water content of the polymer solution, it is preferable to use at least 0.001 mol, more preferably at least 0.002 mol, of the catalyst per mol of the vinyl ester units. If it is used in too large a quantity, however, the remaining alkali is difficult to remove from the polymer and produces undesirable results, such as the coloring of the polymer. Therefore, it is preferable not to use more than 0.2 mol of the catalyst per mol of the vinyl ester units.

The thiolcarboxylic acid ester at the end of a polyvinyl ester having a thiolcarboxylic acid ester group at its end and the vinyl ester bond in its main chain are, thus, saponified into a thiol group and vinyl alcohol, respectively. There is no particular limitation to the saponification degree of the vinyl ester units if it amounts to at least 20 mol %, preferably at least 50 mol % and more preferably at least 70 mol %, depending on the purpose for which the product will be used. The polymer precipitated as a result of the saponification is purified by a known method, including washing with methanol, for removing the remaining alkali, alkali metal salt of acetic acid and other impurities, and dried, whereby a powder, which is usually white, is obtained.

Reference is now made to the radical polymerization of a monomer having an ionic group in the presence of PVA having a thiol end group. While any known process, such as bulk, solution, pearl or emulsion polymerization, may be employed, it is preferable to carry it out in a solvent which dissolves PVA, for example, a medium consisting mainly of water or dimethylsulfoxide. Any of the batch, semibatch and continuous methods may be used for polymerization.

The radical polymerization for producing the block copolymer is carried out in the presence of an ordinary radical polymerization initiator which is suitable for the polymerization system employed, and which may be selected from, for example, 2,2'-azobisisobutyronitrile, benzoyl peroxide, lauroyl peroxide, diisopropyl peroxycarbonate, potassium persulfate and ammonium persulfate. If the polymerization system is aqueous, it is possible to initiate the polymerization by a redox reaction between the thiol end group of PVA and an oxidizing agent, such as potassium bromate or persulfate, ammonium persulfate or hydrogen peroxide Potassium bromate is a particularly suitable initiator for the synthesis of the block copolymer according to this invention, since it alone does not produce any radical under ordinary polymerizing conditions, but is decomposed and produces a radical only as a result of its redox reaction with the thiol end group of PVA.

According to this invention, it is important and desirable that the radical polymerization be carried out under acidic conditions. In a basic environment, the addition reaction of a thiol group to the double bond of the monomer takes place too fast, resulting in the rapid disappearance of the thiol group and a drastically lowered polymerization efficiency. If an aqueous system is employed, it is desirable that the whole polymerization operation be completed in an environment having a pH level of 4 or below.

The term "PVA" as herein used refers to a polymer containing at least 20 mol %, preferably at least 50 mol %, and more preferably at least 70 mol %, of vinyl alcohol units. It may contain without presenting any problem up to 20 mol % of other monomeric components, such as vinyl acetate, vinyl formate, vinyl propionate, vinyl ester of versatic acid, ethylene, propylene, (meth)acrylic acid and the salts thereof, itaconic acid, maleic acid or fumaric acid and the salts thereof, 2-acrylamidepropanesulfonic acid and the salts thereof and (meth)acrylamidepropyltrimethylammonium chloride. It is possible to use any PVA having a polymerization degree of 10 to 3500.

The other constituent of the block copolymer, which is one of the components of the polymer composition according to this invention, is a polymer unit having an ionic group.

It is possible to use without any particular limitation a homopolymer or copolymer of a radical (co)polymerizable ionic monomer, for example, an anionic monomer such as acrylic acid, methacrylic acid, itaconic acid, maleic acid, fumaric acid, vinylsulfuric acid, vinylsulfonic acid, p-styrenesulfonic acid, 2-acrylamidepropanesulfonic acid, or 2-acryloyloxyethylphosphoric acid or a metal or ammonium salt thereof, or a cationic monomer such as dimethylaminoethyl(meth)acrylate or (meth)acrylamidepropyltrimethylammoniumchloride, or a copolymer of any such ionic monomer described above and a radical (co)polymerizable nonionic monomer such as acrylamide, methacrylamide, N,N-dimethylacrylamide, N-vinylpyrrolidone, methyl (meth)acrylate, ethyl (meth)acrylate, 2-methoxyethyl acrylate, (meth)acrylonitrile, ethylene or propylene.

It is particularly preferable to prepare the ionic polymer unit from acrylic or methacrylic acid or another monomer containing a carboxyl group (including a metal or ammonium salt), vinylsulfonic acid, p-styrenesulfonic acid or 2-acrylamidepropanesulfonic acid or another monomer containing a sulfonic acid group (including a metal or ammonium salt), or among the nonionic monomers copolymerizable with those ionic monomers, acrylamide, methacrylamide, N,N-dimethylacrylamide or N-vinylpyrrolidone. The ionic polymer unit may contain the ionic group in the amount of 0.5 to 100 mol %, preferably 1 to 100 mol %, and more preferably 2 to 100 mol % based on the ionic polymer unit in view of its interaction with protein.

Although there is no particular limitation to the ratio by weight of the PVA polymer unit as one constituent to the ionic polymer unit as another constituent in the block copolymer, it is possible to obtain a block copolymer having excellent compatibility with protein and thereby produce the polymer composition intended by this invention if the following relationship concerning the ratio by weight exists:

$0.2 \leq$ PVA polymer unit/ionic polymer unit $\leq 50$ preferably $0.3 \leq$ PVA polymer unit/ionic polymer unit $\leq 40$ and more preferably $0.5 \leq$ PVA polymer unit/ionic polymer unit $\leq 25$.

The block copolymer of this invention has a wide variety of degrees of water solubility ranging from water-soluble to water-dispersible depending on the degree of saponification of the PVA polymer unit, the content of the ionic group and the composition of the ionic polymer unit, and the ratio by weight of the PVA polymer unit to the ionic polymer unit. In this invention, a water-soluble block copolymer and a water-dispersible block copolymer can as well as be used effectively.

The protein in this invention may be selected from, for example, gelatin, glue, casein, albumin and the modified products thereof. The protein described above in this invention is mainly water-soluble, and moreover the protein in this invention may also include water-dipersible proteins such as derivatives of said protein.

It is preferable to use gelatin or casein if the polymer composition of this invention is used for making a photographic emulsion, microcapsules or a photosensitive material. If it is used for preparing, for example, a paper processing agent, an adhesive, protective colloids or a fiber treating agent, it is preferable to use casein.

In addition to the block copolymer and the protein, the polymer composition of this invention may contain other components that may be selected in accordance with the purpose for which it will be used.

The protein and the block copolymer may have a ratio by weight of preferably from 10/90 to 99/1, and more preferably from 20/80 to 95/5 (protein/block copolymer).

When the ratio by weight of protein to the block copolymer is greater than 99/1, the drawbacks of protein, for example, such as brittleness, weakness and stickiness in case of gelatin cannot be improved. And when the ratio by weight of protein to the block copolymer is smaller than 10/90, the superior characteristic of protein, for example, such as the sol-gel reversibility depending on temperature in case of gelatin is adversely affected.

The polymer composition can contain polyvinyl alcohol or other water-soluble polymers if they are acceptable from a compatibility standpoint and in view of the objects of this invention.

The good compatibility of the block copolymer with the protein in the polymer composition of this invention is apparently due to the electrostatic interaction between the ionic group in the protein, which is an amino acid residue, and the ionic group in the block copolymer.

This invention will now be described in further detail with reference to examples thereof. In the examples, % and parts are both shown by weight.

(i) Preparation of the Block Copolymer 100 parts of polyvinyl alcohol having a thiol end group (degree of saponification; 98.7 mol %, $[HS] = 1.46 \times 10^{-5}$ eq/g) were dissolved in 420 parts of distilled water under boiling. The solution was cooled to ambient temperature and 1N- $H_2SO_4$ was added thereto to control its pH to 3.0.

Then, 30 parts of acrylic acid monomer were dissolved in the solution, and after nitrogen purging, the solution was heated to 70° C. and an aqueous initiator solution which had been prepared by dissolving 0.38 part of $K_2S_2O_8$ in 20 parts of distilled water was added to initiate polymerization. The polymerization reaction was continued at 70° C. for three hours under stirring and the reaction product was cooled to ambient temperature, whereby an aqueous solution of a polyvinyl alcohol-polyacrylic acid block copolymer was obtained. It was adjusted to a pH value of 5.5 by adding 1N-NaOH. It had a concentration of 17.3% and a viscosity of 4500 cp at 20° C.

This block copolymer will hereinafter be called "block copolymer A".

Block copolymers B to O having different degrees of polymerization and different compositions were likewise prepared. The composition, concentration, pH and viscosity at 20° C. of these block copolymers are shown in TABLE 1.

| Block copolymer | Composition* (weight ratio) | | | | | | | | Concentration (%) | pH | Viscosity at 20° C. (cp) | |
|---|---|---|---|---|---|---|---|---|---|---|---|---|
| | PVA | AA | MAA | AMPS | CM | AAm | 2-MEA | MA | | | | |
| A | 100 | 30 | — | — | — | — | — | — | 17.3 | 5.5 | 4500 | water-soluble |
| B | 100 | 40 | 10 | — | — | — | — | — | 15.2 | 3.5 | 1200 | water-soluble |
| C | 100 | — | — | 30 | — | — | — | — | 15.3 | 5.2 | 3200 | water-soluble |
| D | 100 | — | — | — | 50 | — | — | — | 14.9 | 5.3 | 2100 | water-soluble |
| E | 100 | 5 | — | — | 95 | — | — | — | 10.5 | 4.0 | 4500 | water-soluble |

-continued

| Block copolymer | Composition* (weight ratio) | | | | | | | | Concentration (%) | pH | Viscosity at 20° C. (cp) | |
|---|---|---|---|---|---|---|---|---|---|---|---|---|
| | PVA | AA | MAA | AMPS | CM | AAm | 2-MEA | MA | | | | |
| F | 100 | 3 | — | — | — | 27 | — | — | 15.7 | 5.3 | 650 | water-soluble |
| G | 100 | 10 | — | — | — | 190 | — | — | 10.2 | 4.0 | 2900 | water-soluble |
| H | 100 | 3 | — | — | — | 97 | — | — | 10.1 | 4.2 | 3100 | water-soluble |
| I | 100 | 20 | — | — | — | 80 | — | — | 10.5 | 4.0 | 2400 | water-soluble |
| J | 100 | — | 9 | — | — | 21 | — | — | 15.7 | 5.3 | 3700 | water-soluble |
| K** | 100 | 10 | — | — | — | — | — | — | 10.5 | 4.0 | 5100 | water-soluble |
| L | 100 | 3 | — | — | — | — | 27 | — | 15.7 | 5.0 | 250 | water-dispersible |
| M | 100 | — | 9 | — | — | — | — | 21 | 15.7 | 5.1 | 630 | water-dispersible |
| N | 100 | 0.1 | — | — | — | 99.9 | — | — | 18.3 | 6.0 | 6500 | water-soluble |
| O | 100 | — | — | — | — | 100 | — | — | 10.3 | 4.1 | 700 | water-soluble |

Notes:
*PVA: Polyvinyl alcohol
AA: Acrylic acid
MAA: Methacrylic acid
AMPS: Acrylamidepropanesulfonic acid
CM: Acrylamidepropyltrimethylammonium chloride
AAm: Acrylamide
2-MEA: 2-methoxyethyl acrylate
MA: Methyl acrylate
**K contains 2 mol % of itaconic acid units in PVA.

EXAMPLES 1 TO 11 AND COMPARATIVE EXAMPLES 1 TO 8

(ii)-a: Properties of Film Obtained by Casting Polymer Composition

A 10% aqueous solution of gelatin (product of KANTO CHEMICAL CO., INC.) was mixed at 50° C. with an equal quantity of a 10% aqueous solution of each of the polymers shown in TABLE 2. They were fully mixed under stirring at 80° C. The mixed solution was cast on a polyester film to form a film having a dry thickness of 20 microns and the film was dried with air at ambient temperature.

The following tests were conducted on each of the films prepared as hereinabove described. The test results are shown in TABLE 2.

Test 1:

Each film was examined for phase separation and transparency and evaluated for compatibility. The symbols used for indicating the results have the following meanings:

o: Completely transparent film;
Δ: Somewhat opaque film; and
x: Film in which phase separation was observed.

Test 2:

The films which had been evaluated as o or Δ in Test 1 were tested for tear strength. A film prepared solely from gelatin was also tested. The three symbols showing the results of the test have the following meanings:

o: Strong and tough;
Δ: Somewhat weak; and
x: Weak and brittle.

Test 3:

The films which had been evaluated as o or Δ in Test 1 were placed in an environment having a temperature of 20° C. and a relative humidity of 95%. Then, a finger was rubbed against the surface of each film to see if it was sticky. A film prepared solely from gelatin was also tested. The three symbols showing the test results have the following meanings:

o: Not sticky at all;
Δ: Somewhat sticky; and
x: Considerably sticky.

TABLE 2

| Example No. | Polymer employed | RESULTS | | |
|---|---|---|---|---|
| | | Test 1 | Test 2 | Test 3 |
| Example | | | | |
| 1 | Block copolymer A | o | o | o |
| 2 | Block copolymer B | o | o | Δ |
| 3 | Block copolymer C | o | Δ | o |
| 4 | Block copolymer D | o | o | Δ |
| 5 | Block copolymer E | o | o | o |
| 6 | Block copolymer F | o | o | o |
| 7 | Block copolymer G | o | Δ | Δ |
| 8 | Block copolymer H | o | o | o |
| 9 | Block copolymer K | o | o | o |
| 10 | Block copolymer L | o | o | o |
| 11 | Block copolymer M | o | Δ | o |
| Comparative Example | | | | |
| 1 | Block copolymer N | x | — | — |
| 2 | Block copolymer O | x | — | — |
| 3 | PVA-117 (product of KURARAY CO., LTD.) | x | — | — |
| 4 | PVA-205 (product of KURARAY CO., LTD.) | x | — | — |
| 5 | Carboxyl-modified PVA having a modification degree of 1 mol % | x | — | — |
| 6 | Carboxyl-modified PVA having a modification degree of 3 mol % | x | — | — |
| 7 | Polyacrylamide | x | — | — |
| 8 | Poly(acrylamide/acrylic acid) = 95/5 | o | x | x |
| Control | Gelatin alone (product of | — | x | x |

TABLE 2-continued

| Example No. | Polymer employed | RESULTS Test 1 | Test 2 | Test 3 |
|---|---|---|---|---|
| | KANTO CHEMICAL CO., INC.) | | | |

As is obvious from TABLE 2, a film of high transparency and tear strength which was not or hardly sticky was obtained only when the polymer mixed with gelatin was a block copolymer containing a PVA polymer unit as one constituent and a polymer unit having ionic group as another constituent.

Though the random copolymer of acrylamide/acrylic acid of COMPARATIVE EXAMPLE 8 was well compatible with gelatin and formed a transparent film, it was as bad as the gelatin film both in strength and in resistance to stickiness. It did not show the excellent results which the polymer composition of this invention produced.

EXAMPLES 12 TO 17 AND COMPARATIVE EXAMPLE 9

(ii)-b: Properties of Film Obtained by Casting Polymer Composition

A 10% aqueous solution of gelatin (product of KANTO CHEMICAL CO., INC.) was mixed at 50° C. with various amounts of a 10% aqueous solution of Block copolymer A shown in TABLE 1 so as to produce various ratios by weight of gelatin to Block copolymer A.

They were fully mixed under stirring at 80° C. The mixed solution was cast on a polyester film to form a film having a dry thickness of 20 microns and the film was dried with air at ambient temperature. Test 1 to Test 3, as described above, were conducted on each of the films prepared as hereinabove described. The test results are shown in TABLE 3. The symbols showing the results have the same meanings defined above.

As is obvious from TABLE 3, a film of high transparency and tear strength which was not or hardly sticky was obtained only when the ratio by weight of gelatin to Block copolymer A is in the range of from 10/90 to 99/1. By the way, in case of a film having a ratio by weight of gelatin to Block copolymer A of 5/95, the sol-gel reversibility depending on temperature of gelatin was adversely affected.

TABLE 3

| Example No. | Ratio by weight of gelatin to Block copolymer A | RESULTS Test 1 | Test 2 | Test 3 |
|---|---|---|---|---|
| Example | | | | |
| 12 | 97/3 | o | o~Δ | o~Δ |
| 13 | 90/10 | o | o | o |
| 14 | 70/30 | o | o | o |
| 15 | 50/50 | o | o | o |
| 16 | 30/70 | o | o | o |
| 17 | 15/85 | o | o | o~Δ |
| Comparative Example | | | | |
| 9 | 99.5/0.5 | o | x | x |

EXAMPLES 18 TO 26 AND COMPARATIVE EXAMPLES 10 TO 15

(ii)-c: Properties of Film Obtained by Casting Polymer Composition

A 5% casein (product of NAKARAI CHEMICALS, LTD.) aqueous solution dissolved in ammonium water was mixed at 50° C. with an equal quantity of a 5% aqueous solution of each of the polymers shown in TABLE 4. They were fully mixed under stirring at 80° C. The mixed solution was cast on a polyester film to form a film having a dry thickness of 20 microns and the film was dried with air at ambient temperature. Each of the films prepared as hereinabove described was examined for phase separation and transparency and evaluated for compatibility. The results are shown in TABLE 4. The symbols showing the results have the following meanings:

o: Completely transparent film;
Δ: Somewhat opaque film; and
x: Film in which phase separation was observed.

TABLE 4

| Example No. | Polymer employed | Compatibility |
|---|---|---|
| 18 | Block copolymer A | o |
| 19 | Block copolymer B | o |
| 20 | Block copolymer C | o |
| 21 | Block copolymer D | o |
| 22 | Block copolymer I | o |
| 23 | Block copolymer J | o |
| 24 | Block copolymer K | o |
| 25 | Block copolymer L | o |
| 26 | Block copolymer M | o |
| COMPARATIVE EXAMPLE | | |
| 10 | Block copolymer N | x |
| 11 | Block copolymer O | x |
| 12 | PVA-117 (product of KURARAY CO., LTD.) | x |
| 13 | PVA-205 (product of KURARAY CO., LTD.) | x |
| 14 | Carboxyl-modified PVA having a modification degree of 1 mol % | x |
| 15 | Carboxyl-modified PVA having a modification degree of 3 mol % | x |

As is obvious from TABLE 4, a film of high transparency and compatibility was obtained only when the polymer mixed with casein was a block copolymer containing a PVA polymer unit as one constituent and a polymer unit having ionic group as another constituent. These films were stronger and more tough than a film prepared solely from casein.

What is claimed is:

1. A polymer composition comprising:
   a block copolymer containing a polyvinyl alcohol polymer unit as one constituent and a polymer unit having an ionic group as another constituent; and
   at least one protein;
   wherein the polyvinyl alcohol polymer unit has at least 20 mole percent of vinyl alcohol units and has a degree of polymerization of from 10 to 3500, and contains up to 20 mole percent of other monomeric components; wherein the ratio by weight of the polyvinyl alcohol polymer unit to the polymer unit having an ionic group in the block copolymer is in the range of from 0.2 to 50; wherein the polymer unit having an ionic group contains 0.5 to 100 mole percent of the ionic group based on the polymer unit having an ionic group; and further wherein the ratio by weight of protein to the block copolymer is in the range of from 10/90 to 99/1.

2. A polymer composition as set forth in claim 1, wherein the ionic groups in the polymer unit having an ionic group is at least one selected from the group consisting of carboxylic acid, sulfuric acid, sulfonic acid and phosphoric acid groups.

3. A polymer composition as set forth in claim 1, wherein the ionic group in the polymer unit having an ionic group is at least one selected from the group consisting of an amino group and a quaternary ammonium salt.

4. A polymer composition as set forth in claim 1, wherein the protein is gelatin.

5. A polymer composition as set forth in claim 1, wherein the protein is casein.

* * * * *